United States Patent [19]
Phelps et al.

[11] Patent Number: 5,307,681
[45] Date of Patent: May 3, 1994

[54] TRANSIENT TEMPERATURE COMPENSATION FOR PRESSURE GAUGES USING DISCRETE TEMPERATURE HISTORY MEASUREMENTS FOR GAUGE CALIBRATION

[75] Inventors: Eric B. Phelps, Littleton; Gary R. Cook, Highlands Ranch; Wayne O. Roszelle, Littleton, all of Colo.

[73] Assignee: Marathon Oil Company, Findlay, Ohio

[21] Appl. No.: 926,065

[22] Filed: Aug. 5, 1992

[51] Int. Cl.$^5$ .............................. G01L 19/04
[52] U.S. Cl. .................. 73/708; 364/571.03
[58] Field of Search .................. 73/702, 708; 364/571.01, 571.02, 571.03, 571.04, 571.07, 558

[56] References Cited

U.S. PATENT DOCUMENTS

| | | | |
|---|---|---|---|
| 3,561,832 | 4/1969 | Karrer et al. | 310/9.6 |
| 4,192,005 | 3/1980 | Kurtz | 364/571.03 |
| 4,607,530 | 8/1986 | Chow | 73/708 |
| 4,765,188 | 8/1988 | Krechmery et al. | 73/708 |
| 4,866,640 | 9/1989 | Morrison, Jr. | 364/558 |
| 4,893,505 | 1/1990 | Marsden et al. | 73/708 |
| 4,901,257 | 2/1990 | Chang et al. | 364/571.01 |
| 4,931,977 | 6/1990 | Klemes | 364/571.02 |

OTHER PUBLICATIONS

G. W. Haws, et al., "State-of-the-Art Simultaneous Downhole Flow Rate and Pressure Measurement Equipment", *Society of Petroleum Engineers, 65th Annual Technical Conference and Exhibition*, Sep. 23, 1990.
A. F. Veneruso, et al., "Pressure Gauge Specification Considerations in Practical Well Testing", Society of Petroleum Engineers, 66th Annual Technical Conference and Exhibition, Oct. 6, 1991.

*Primary Examiner*—Richard E. Chilcot, Jr.
*Assistant Examiner*—William L. Oen

[57] ABSTRACT

Disclosed is a system wherein the compensation for temperature effects on a pressure measurement gauge are accomplished by processing the raw pressure measurement signal from the gauge through an equation to produce a thermally compensated measurement. The equation expresses the thermally compensated pressure determination as a relation between a derivative of temperature and temperature. When the gauge is placed in an oil or gas well, the equation is used to obtain a correction for the measured pressure from the temperature measured adjacent to the pressure gauge.

8 Claims, 6 Drawing Sheets

TRANSIENT TEMPERATURE COMPENSATION FOR PRESSURE GAUGES USING DISCRETE TEMPERATURE HISTORY MEASUREMENTS FOR GAUGE CALIBRATION

DESCRIPTION

Cross Reference to Related Applications

This application is related to application Ser. No. 07/926,097, entitled Transient Temperature Compensation for Pressure Gauges, of Phelps, Cook, and Roszelle, and application Ser. No. 07/926096, entitled Transient Temoerature Compensation for Pressure Gauges Using an Impulse Response for Gauge Calibration, of Phelps, Cook, and Roszelle, filed concurrently herewith.

TECHNICAL FIELD

This invention relates to pressure gauge measurements and more particularly to thermal compensation of pressure gauge measurements. Even more particularly, the invention relates to compensation of measurement errors due to the effects of thermal transients on pressure gauges within an oil or gas well.

BACKGROUND OF THE INVENTION

In the pressure gauge arts, pressure gauges employing precision piezoelectric quartz resonators are known for providing highly accurate pressure determinations. U.S. Pat. No. 3,561,832 issued to Kerrer et al., and assigned to Hewlett-Packard Company, shows a quartz pressure gauge which is created from a single piece of crystalline quartz with the gauge comprising a hollowed cylinder and a circular resonator with electronics thereupon. The cylinder may be oriented with respect to the crystalline access for selected characteristics. By applying a predetermined voltage to the resonator, the resonator may be caused to resonate at a resonance frequency. The application of pressure around the cylinder causes the resonator to change its oscillation frequency, thus by measuring the change in oscillation frequency, the applied pressure may be accurately determined.

While the oscillation frequency of the resonator of the quartz pressure gauge is a function of the applied pressure, it is known that the frequency is also affected by temperature. Thus, in order to provide an exact measure of the applied pressure, the reading must be compensated for temperature changes. One prior art method for eliminating the temperature effect on the pressure measuring gauge is to provide an isolated second reference gauge which is kept at a constant pressure but which is subjected to the same temperature fluctuations as the first gauge. When both gauges have attained thermal equilibrium at the same temperature, the difference in frequencies output by the gauges is directly correlated to the pressure measured by the first gauge.

The above described technique is effective only after both gauges have reached the same temperature equilibrium. It is ineffective when temperature transients occur, since the second gauge is likely to reach equilibrium at a slower rate than the first gauge. This is because the second gauge must be surrounded by some material which protects it from the pressure fluctuations, and this material will also provide some thermal isolation. In addition to thermal transients occurring in the fluid or gas being measured, if the fluid or gas changes pressure, this pressure change may induce an adiabatic temperature change in the gauge that is subject to pressure. The second gauge, however, which is isolated from the pressure change, would not undergo the adiabatic change.

U.S. Pat. No. 4,607,530 issued Aug. 26, 1986 to Chow, entitled "Temperature Compensation for Pressure Gauges" discloses one prior art method for compensating for thermal transients. This method relies on the physical construction of the gauge, and upon creating a dynamic model that compensates for the flow of heat through the physical exterior of the gauge to the interior where the pressure is being measured. The method uses a fast responding thermal device on the exterior of the gauge to measure the temperature at the exterior, and uses the model to predict the temperature on the interior of the gauge at the location of the resonator. By calibrating the gauge to provide a known relationship between the frequency of the resonator and the temperature of the resonator, the system then uses the dynamic model to predict the temperature of the resonator based upon the temperature of the fast acting thermal device. Thus, as the temperature around the gauge changes, the model, in combination with the fast responding thermal device, will predict the temperature of the resonator. The resonator temperature can then be used to determine the pressure error due to the temperature.

The method of Chow suffers from the limitation that the dynamic model is based on the construction of the particular gauge being used to perform the measurement. Thus, this method may not easily be adapted to other manufacturer's gauges, or to other types of gauges.

"State-of-the-Art Simultaneous Downhole Flow Rate and Pressure Measurement Equipment" by G. W. Haws and B. L. Knight, published at the 65th Annual Technical Conference and Exhibition of the Society of Petroleum Engineers, Sep. 23, 1990, describes thermally compensating pressure gauges using a differential equation which is a modification of an RC electrical circuit description. "Pressure Gauge specification considerations in Practical Well Testing", by A. F. Veneruso, et al., published at the 66th Annual Technical Conference and Exhibition of the Society of Petroleum Engineers, Oct. 6, 1991, also describes thermal compensation of pressure gauges using a differential equation similar to the Haws and Knight equation. Both these methods are limited in their accuracy.

It is thus apparent that there is a need in the art for an improved method of compensating for transient temperature changes while measuring pressure in an oil or gas well. There is further need in the art for such a method that does not depend upon the physical construction of the gauge used during the measurement. The present invention meets these and other needs.

DISCLOSURE OF INVENTION

It is an aspect of the present invention to provide a method for the thermal compensation of a pressure gauge.

It is another aspect of the invention to provide a method that is based upon calibration data for the gauge.

Yet another aspect of the invention is to provide thermally compensated measurements in a well logging environment.

A still further aspect is to provide such a method that quickly compensates for transient thermal changes.

The above and other aspects of the invention are accomplished in a system wherein the compensation for temperature effects on a pressure measurement gauge are accomplished by processing the raw measurement signal from the gauge through an equation to produce a thermally compensated measurement, more accurate than the raw measurement. The equation expresses the thermally compensated pressure determination as a relation between past temperatures measured at discrete intervals and a derivative of past temperatures measured at discrete intervals. When the gauge is placed in an oil or gas well, the equation is used to obtain the corrected measured pressure from the raw measured pressure received from the gauge.

The thermally compensated measurement can be plotted to show pressure changes with respect to time or depth in a borehole. The measurement can also be used to control flow of fluid or gas from the borehole, thus preventing the pressure from dropping to an unacceptably low value. Also, the measurement can be input to a control system to control the flow and pressure of fluid being injected into adjacent boreholes, in order to prevent excessive pressure buildup in the borehole.

DESCRIPTION OF THE DRAWINGS

The above and other aspects, features, and advantages of the invention will be better understood by reading the following more particular description of the invention, presented in conjunction with the following drawings, wherein.

BEST MODE FOR CARRYING OUT THE INVENTION

The following description is of the best presently contemplated mode of carrying out the present invention. This description is not to be taken in a limiting sense but is made merely for the purpose of describing the general principles of the invention. The scope of the invention should be determined by referencing the appended claims.

When a pressure gauge is placed in a liquid or gas for the purpose of measuring pressure, for example, when a pressure gauge is placed in an oil or gas well to measure the pressure of the oil or gas therein, the measurement is also affected by the temperature of the gauge performing the pressure measurement. This problem is particularly acute when sudden thermal changes occur, causing the pressure reading to be inaccurate until the entire gauge stabilizes to the new temperature.

The pressure error caused by change in temperature can be modeled by the linear differential equation:

$$\sum_{i=0}^{n} q_i(T) p_e^{(n-i)}(t) = \frac{dT}{dt}(t) \quad (1)$$

Where $p_e$ is the pressure error, T is temperature, t is time, and the $q_i$'s are functions of temperature. A general expression for the solution to the liner differential equation (1) is:

$$p_e(t) = \sum_{i=0}^{n} a_i \frac{dT}{dt}(t-i) + \sum_{j=0}^{m} b_j T(t-j) \quad (2)$$

Where $p_e$ is the pressure error, T is temperature, t is time, the $a_i$'s are coefficients determined by the derivative of past temperatures taken at discrete intervals and the $b_j$'s are coefficients determined by past temperatures taken at discrete intervals.

This equation provides an error function of temperature history that can be treated as a filtered version of that history. The coefficients for a finite response linear filter can be determined by a least squares fit in the time domain from carefully measured pressure errors and temperature data. This filter can then be excited by any given temperature profile to generate an error model that can be used to correct pressure readings.

The equation provides the basis for an $(n+1)(m+1)$-dimensional linear least squares fit. Before the equation can be applied, each of the coefficient values for $a_i$ and $b_j$ must be determined. The coefficients are determined using a calibration method, which can be performed with any set of time, temperature, and pressure error data. A linear least squares fit of the model can be found by several standard methods. The accuracy of the calibration is determined by the amount of data collected, and the temperature range over which this data is collected.

Figure 1:
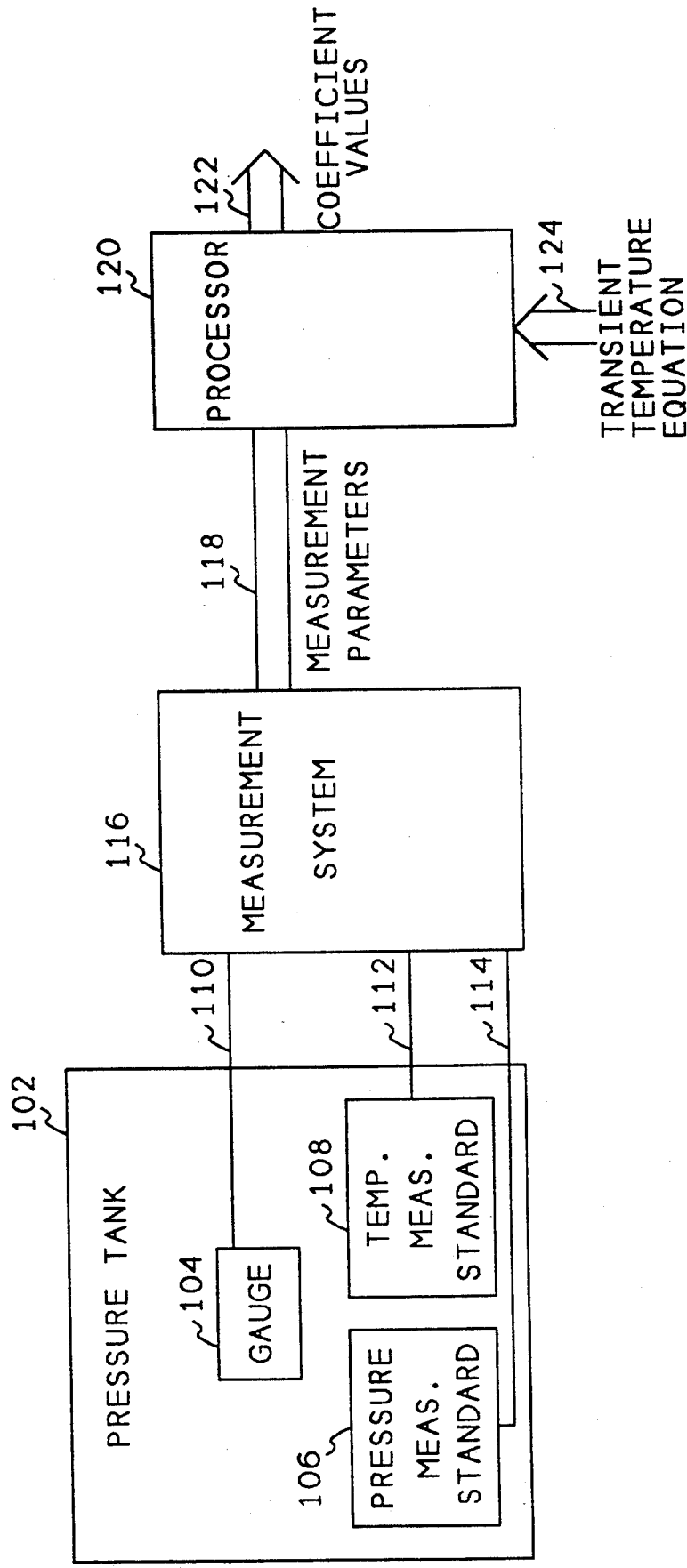
FIG. 1 shows a block diagram of the calibration system of the present invention.

FIG. 1 shows a block diagram of the system necessary to perform the calibration operation described above. Referring now to FIG. 1, a pressure tank 102 contains the gauge of the present invention 104, a pressure measurement standard gauge 106, and a temperature measurement standard gauge 108. Signals 110, 114, and 112 from these three instruments are connected to a measurement system 116. The measurement system 116 collects the information from the three gauges, converts the raw frequency data into temperature and pressure measurements, and sends these measurement parameters 118 to a processor 120. The processor 120 takes the measurement parameters 118 and the transient temperature equation 124, which is equation (2) described above, and computes the coefficient values 122 for the coefficients $a_i$ and $b_j$.

Figure 2:
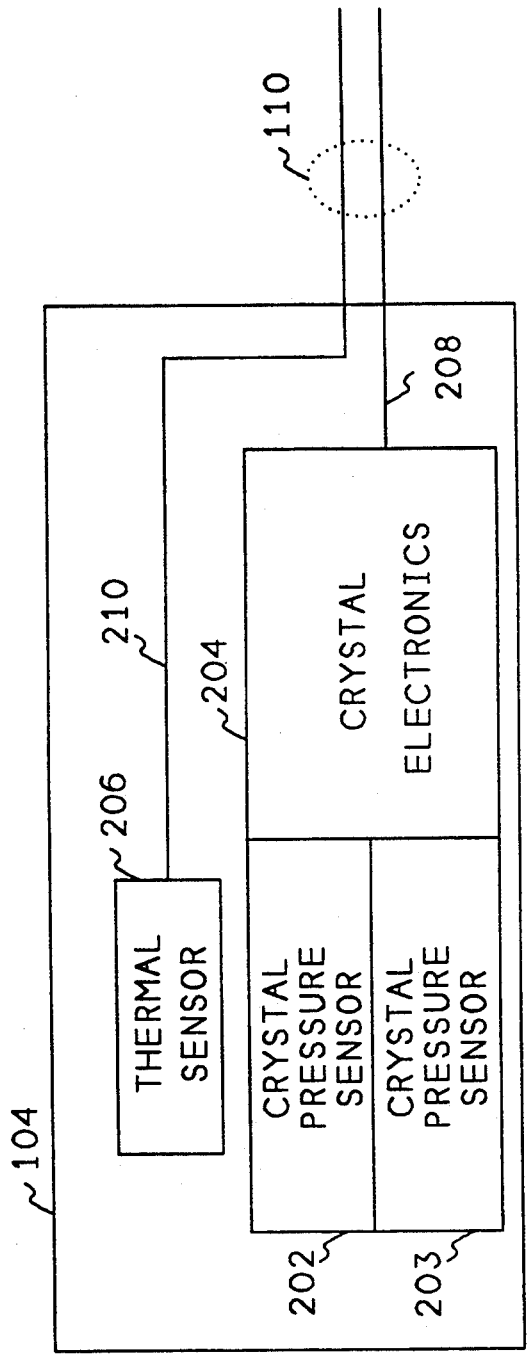
FIG. 2 shows a block diagram of the pressure gauge of FIG. 1 and illustrates the thermal sensor attached to the gauge.

FIG. 2 shows a block diagram of the gauge 104 of FIG. 1. Referring now to FIG. 2, the gauge 104 contains a pair of crystal pressure sensors 202 and 203 which are connected to crystal electronics 204. Crystal pressure sensor 202 is subject to both temperature and pressure changes, while crystal temperature sensor 203 is isolated from pressure changes and subject to temperature changes only. A description of how the quartz pressure gauge functions may be found in U.S. Pat. No. 3,561,832 issued to Kerrer et al. and assigned to Hewlett Packard Company. On the gauge, and in close proximity to the crystal pressure sensors 202 and 203, a thermal sensor 206 is used to measure the temperature of the surrounding fluid or gas. The thermal sensor 206 is a fast responding thermal temperature sensor to provide a more accurate temperature reading of the surrounding fluid or gas. A pressure signal 208 and the temperature signal 210 are both contained in the gauge signal 110. Prior to performing the transient measurements, the temperature sensor 206 is calibrated, for stable temperature values, to the temperature sensor 108 (FIG. 1).

Although the method of the present invention performs favorably with quartz pressure gauges as described above with respect to FIG. 2, the invention is not so limited. The invention will perform favorably with capacitive type gauges, as well as other types of gauges.

Figure 3:
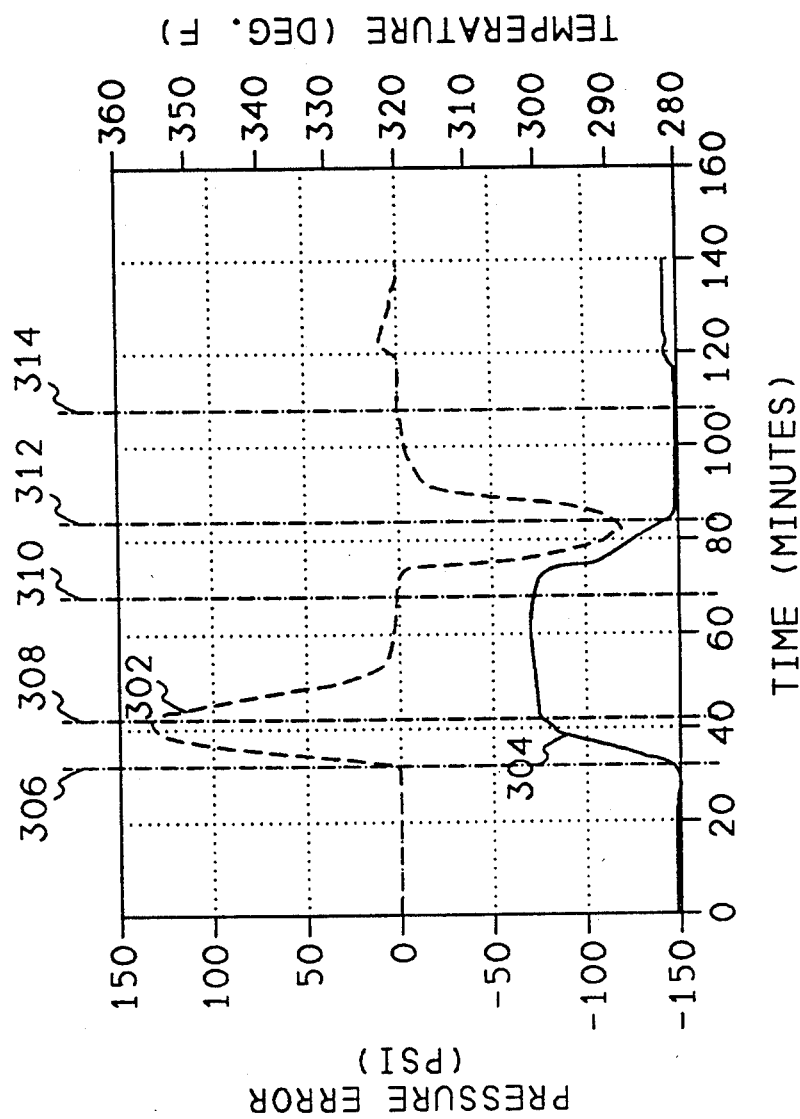
FIG. 3 shows a chart of the temperature and pressure error from a typical measurement before compensation.

FIG. 3 shows a chart of the temperature and pressure error from a typical measurement prior to such measurement being compensated. This chart was constructed using the apparatus described above with respect to FIG. 1, without applying any compensation to the pressure readings. Referring now to FIG. 3, line 304 shows the temperature as measured by the temperature sensor 108 (FIG. 1) of the pressure tank 102. During the measurement that resulted in the chart of FIG. 3, the pressure within pressure tank 102 was kept constant, and is represented on the chart of FIG. 3 by a pressure error of zero. The line 302 in the chart of FIG. 3 represents the pressure error computed by subtracting the pressure measured by gauge 106 from the pressure measured by gauge 104.

Prior to the time represented by vertical line 306, the temperature of the pressure gauge 104 had stabilized at approximately 280° Fahrenheit and the pressure error is indicated as being zero. That is, once the crystals 202 and 203 (FIG. 2) within the pressure gauge 104 reach the surrounding fluid temperature, the pressure reading of the gauge will be correct and there will be no pressure error. As shown in FIG. 3, after the time represented by the vertical line 306, a temperature step impulse was applied to the pressure tank 102 which caused the temperature to rise rapidly to a temperature near 300° Fahrenheit. When the temperature started to rise, the pressure error also changed in a positive direction resulting in a maximum pressure error of approximately 130 pounds per square inch which occurred at the time represented by vertical line 308. After time 308, the temperature stabilized in the pressure tank 102 and the pressure error slowly came back to zero at the point in time represented by vertical line 310. A temperature step function in the opposite direction was then applied to the pressure tank 102 causing the temperature to rapidly return to a temperature of approximately 280° Fahrenheit. While the temperature was decreasing, the pressure reading indicated by the gauge 104 dropped below the actual pressure, indicating a maximum pressure error of approximately minus 130 pounds per square inch, which was reached at the time represented by vertical line 312. Once the temperature stabilized at approximately 280° Fahrenheit, the pressure error reduced back to zero at the time represented by vertical line 314.

The chart of FIG. 3 indicates that pressure error is related to a change in the temperature surrounding the gauge. This then indicates that pressure error is related to the derivative of the temperature.

Figure 4:
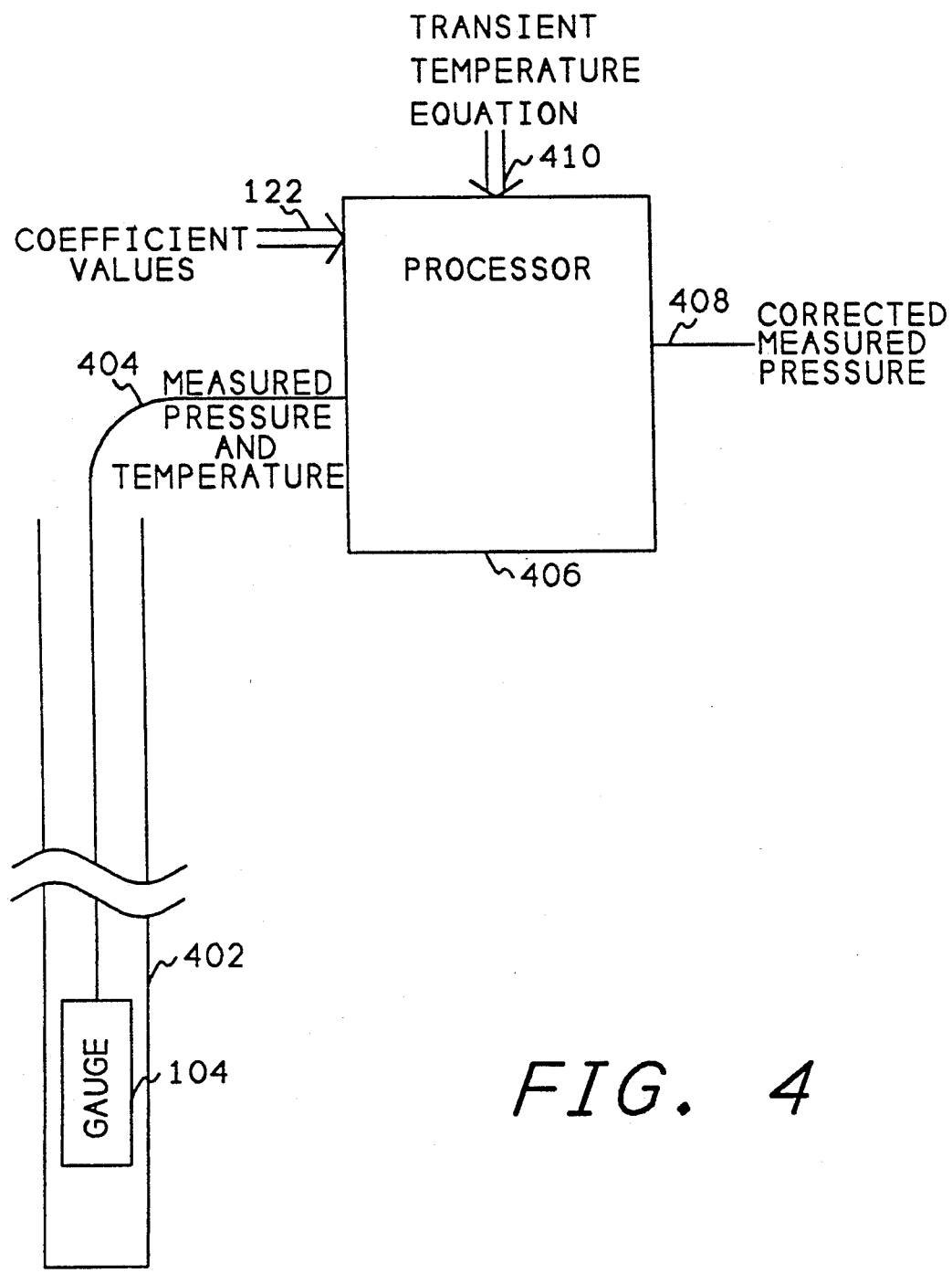
FIG. 4 shows a block diagram of the pressure gauge in use within a well.

FIG. 4 shows a block diagram of the pressure gauge in use within a well. Referring now to FIG. 4, when pressure readings are desired, the gauge 104 is placed within an oil or gas well 402. The measured pressure signal 208 (FIG. 2) and the temperature signal 210 (FIG. 2) are contained within a measured pressure and temperature signal 404 connected between the gauge 104 and a processor 406. The coefficient values 122, which were calculated in the calibration process described above with respect to FIG. 1, are also input to the processor 406. The transient temperature equation 410, which is equation (2) described above, is also input to the processor 406. Using the measured pressure and measured temperature from the signal 404, the coefficient values 122, and the transient temperature equation 410, the processor 406 adjusts the measured pressure from the signal 404 to a corrected measured pressure signal 408. Methods for solving an equation, such as equation (2) described above, on a digital computer are well known in the art.

The corrected measured pressure signal 408 can be used to adjust conditions within the well 402, and it can also be used as input to a plotter to produce a graph of the pressure in the well with respect to other well parameters.

Figure 5:
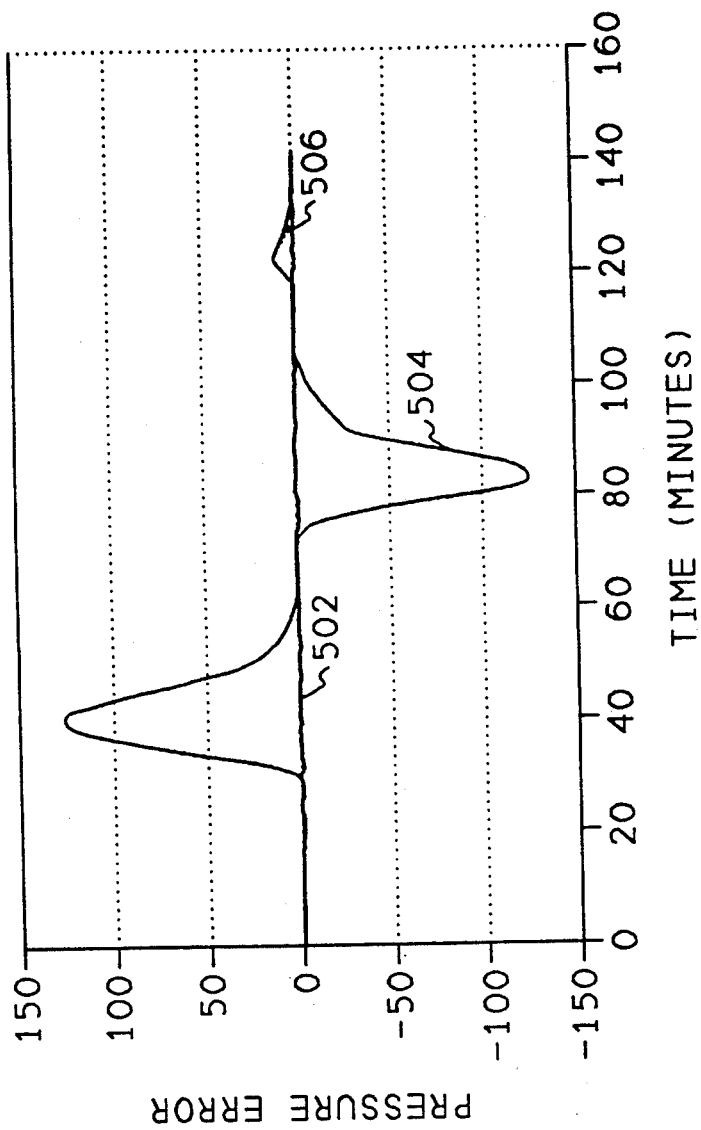
FIG. 5 shows a chart of the temperature, pressure error, and corrected pressure in a typical measurement after being compensated by the present invention.

FIG. 5 shows a chart of the pressure error, pressure adjusted by equation (2), and corrected pressure in a typical measurement after being compensated by the present invention. FIG. 5 was created by using twenty terms for each of the $a_i$ and $b_j$ coefficients. Referring now to FIG. 5, three pressure error signals are shown. Chart line 504 is the pressure error that results from the measured pressure from the gauge 104. Chart line 506 shows the pressure error as would be predicted by the transient temperature equation 410. Chart line 502 shows the difference between these two signals which is the corrected measured pressure signal 408.

Figure 6:
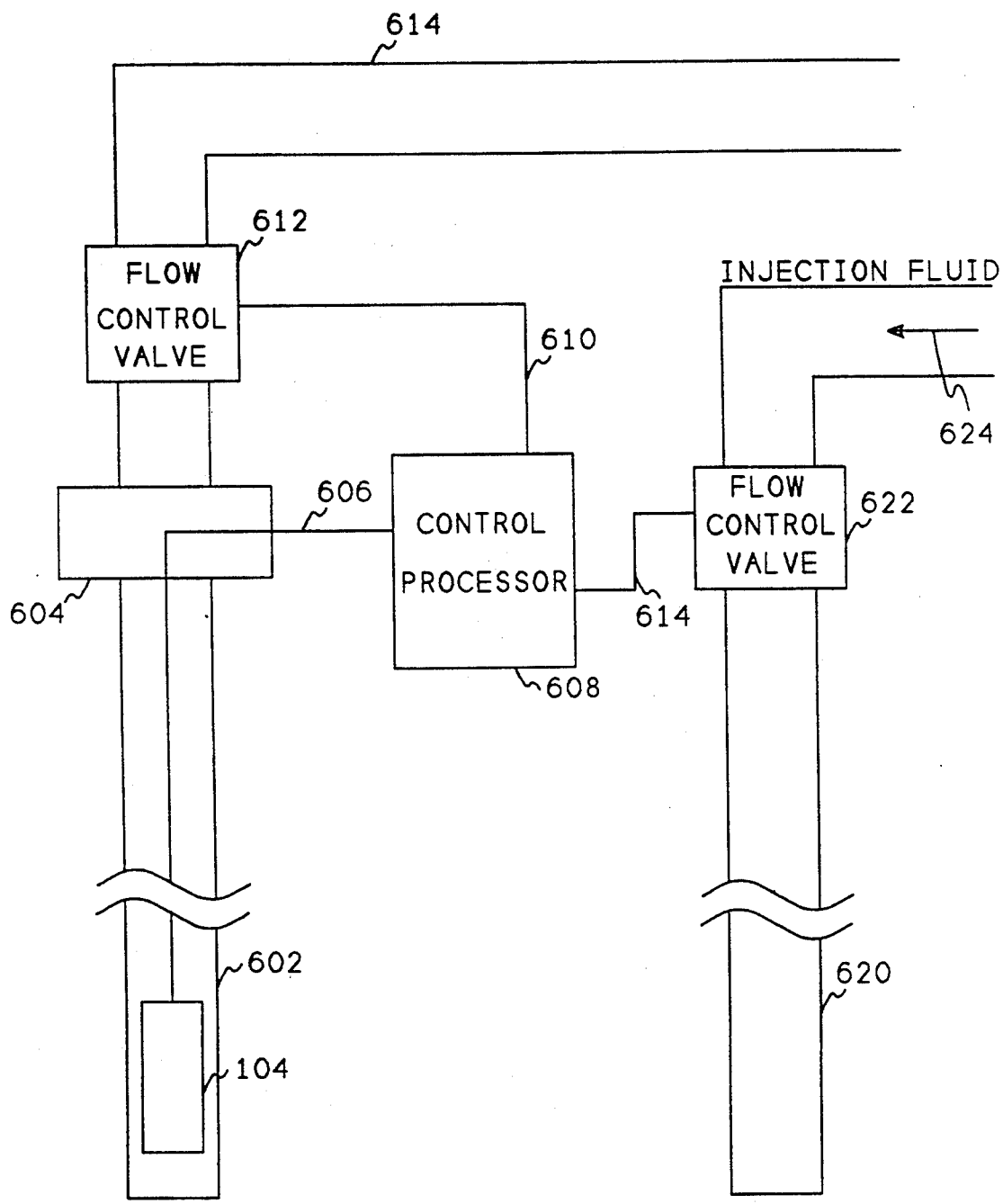
FIG. 6 shows a block diagram of the pressure gauge being used to control oil flow from a well and to control pressure of injection fluid being injected into an injection well.

FIG. 6 shows the environment of the gauge of the present invention and illustrates how the gauge could be used to control pressure within a well. Referring now to FIG. 6, a producing well 602 is shown with the gauge 104 contained therein. An exit valve 604 allows the signal 606 from the gauge 104 to exit the well and connect to a control processor 608. When an injection process is being performed, injection fluid is inserted into wells near the producing well to cause the producing well to produce additional product. However, a problem exists if the injection fluid is injected at too high a pressure, or if too much injection fluid is pumped into the injection wells, since this may cause the geological formation to crack. Therefore, pressure at the producing well must be measured and the injection fluid pressure and amounts must be controlled. The present invention can be used to accurately measure the fluid pressure within the producing well, to control the amount of product being taken from the producing well, and to control the amount of injection fluid being pumped into injection wells.

The measured pressure and temperature signal within the signal 606 is processed by the control processor using the method of the present invention. After the corrected measured pressure is computed, this pressure is then used in a control system to control the amount of oil being taken from the production well. A signal 610 sent by the control processor 608 will open or close the flow control valve 612 to allow product to flow from the flow pipe 614. Also, the control processor 608 outputs a second signal 614 to control the amount of injection fluid being pumped into an adjacent injection well 620. The signal 614 is connected to a flow control valve 622 which regulates the amount and pressure of the injection fluid indicated by arrow 624. Thus, the present invention can be used to control oil being taken from a production well, injection fluid being pumped into nearby injection wells, or a combination of the two.

Having thus described a presently preferred embodiment of the present invention, it will now be appreciated that the aspects of the invention have been fully achieved, and it will be understood by those skilled in the art that many changes in construction and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. A method for thermally compensating the pressure value displayed by a pressure gauge, said method comprising the steps of:
    (a) inputting, into a computer system, an equation which expresses a thermally compensated pressure value as a relation between a derivative of temperature and temperature comprising using $$p_e(t) = \sum_{i=0}^{n} a_i \frac{dT}{dt}(t-i) + \sum_{j=0}^{m} b_j T(t-j)$$

as said equation wherein $p_e$ represents pressure error, T represents temperature, t represents time, each $a_i$ is a function of temperature and each $b_j$ is a function of temperature;
    (b) measuring the pressure of the surroundings of which a pressure value is desired with said pressure gauge;
    (c) measuring the temperature of the immediate environment of said pressure gauge;
    (d) inputting said temperature measurement and said pressure measurement into said computer system containing said equation;
    (e) computing said pressure value using said temperature measurement, said pressure measurement and said equation;
    (f) displaying said thermally compensated pressure value on a display device.

2. The method of claim 1 further comprising the steps of:
    (g) repeating steps (b) through (e) over a period of time; and
    (h) plotting said thermally compensated pressure value with respect to time on a plotting device.

3. The method of claim 1 wherein said temperature measurement is performed using a thermal sensor in close proximity to said gauge.

4. The method of claim 1 wherein said gauge is a quartz pressure gauge.

5. The method of claim 1 wherein said surroundings of which a thermally compensated pressure value is desired is a borehole.

6. The method of claim 5 further comprising the steps of:
    (g) transmitting said thermally compensated pressure value to a control system; and
    (h) controlling flow from said borehole using said control system to limit changes in said thermally compensated pressure value.

7. The method of claim 5 further comprising the steps of:
    (g) transmitting said thermally compensated pressure value to a control system;
    (h) connecting said control system to fluid control valves connected to at lest one adjacent borehole; and
    (i) controlling flow of fluid into said at least one adjacent borehole using said control system to limit said thermally compensated pressure value.

8. A method for thermal compensation of the pressure value made by a pressure gauge within a borehole, said method comprising the steps of:
    (a) inputting, into a computer system, an equation which expresses a thermally compensated pressure value as a relation between a derivative of temperature and temperature comprising using $$p_e(t) = \sum_{i=0}^{n} a_i \frac{dT}{dt}(t-i) + \sum_{j=0}^{m} b_j T(t-j)$$

as said equation wherein $p_e$ represents pressure error, T represents temperature, t represents time, each $a_i$ is a function of temperature and each $b_j$ is a function of temperature;
    (b) placing said pressure gauge in said borehole;
    (c) measuring the pressure within said borehole with said pressure gauge;
    (d) measuring the temperature of the immediate area of said borehole surrounding said pressure gauge;
    (e) inputting said temperature measurement and said pressure measurement into said computer system containing said equation;
    (f) computing said thermally compensated pressure value using said temperature measurement, said pressure measurement and said equation;
    (g) transmitting said thermally compensated pressure value and said pressure error to a control system;
    (h) connecting said control system to fluid control valves connected to at least one adjacent borehole; and
    (i) controlling flow of fluid into said at least one adjacent borehole using said control system to limit said thermally compensated pressure value.

* * * * *